(12) United States Patent
Kogelnik et al.

(10) Patent No.: US 6,684,031 B1
(45) Date of Patent: Jan. 27, 2004

(54) ETHERNET FIBER ACCESS COMMUNICATIONS SYSTEM

(75) Inventors: Herwig W. Kogelnik, Rumson, NJ (US); Martin C. Nuss, Fair Haven, NJ (US); Ashok V. Krishnamoorthy, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/099,503

(22) Filed: Jun. 18, 1998

(51) Int. Cl.[7] ................................................. H04J 14/08
(52) U.S. Cl. ........................ 398/99; 398/100; 398/101
(58) Field of Search ............................... 359/111, 125, 359/167, 136, 121; 370/447, 445; 398/98, 99, 100, 101, 89

(56) References Cited

U.S. PATENT DOCUMENTS

| | | | | |
|---|---|---|---|---|
| 4,617,656 A | * | 10/1986 | Kobayashi et al. | ......... 370/445 |
| 4,719,458 A | * | 1/1988 | Miesterfeld et al. | ..... 340/825.5 |
| 4,781,427 A | * | 11/1988 | Husbands et al. | ....... 350/96.16 |
| 4,797,879 A | * | 1/1989 | Habbab et al. | ................ 370/3 |
| 5,221,983 A | * | 6/1993 | Wagner | ....................... 359/125 |
| 5,311,344 A | * | 5/1994 | Bohn et al. | .................. 359/125 |
| 5,608,729 A | * | 3/1997 | Orsic | ......................... 370/445 |
| 5,917,629 A | * | 6/1999 | Hortensius et al. | ......... 359/136 |
| 5,963,561 A | * | 10/1999 | Lu | .............................. 370/458 |
| 6,014,545 A | * | 1/2000 | Wu et al. | .................... 725/118 |

* cited by examiner

Primary Examiner—Leslie Pascal
Assistant Examiner—Christina Y Leung (57) ABSTRACT

A high-speed access data network in which upstream and downstream traffic is logically or physically separated. The network can use the Ethernet media access control (MAC) layer protocol over distances that are much larger than conventionally possible with the Ethernet MAC layer protocol. In a configuration including a central office and multiple subscribers, the central office is removed from the collision domain, which can be made relatively small, without limiting the distance between the central office and the subscribers. The downstream data rate is not limited by the size of the collision domain and can thus be made almost arbitrarily large. Furthermore, by allowing a smaller collision domain, greater upstream data rates can be used. It is thus possible to use ubiquitous and inexpensive Ethernet LAN technology in highly cost-sensitive applications such as residential broadband access.

14 Claims, 8 Drawing Sheets

Frequency (GHz)

ETHERNET FIBER ACCESS COMMUNICATIONS SYSTEM

FIELD OF THE INVENTION

The present invention relates to the field of data communications networks, in particular to broadband access systems.

BACKGROUND INFORMATION

The World-Wide-Web and the increasing demand for computer power and memory usage of software applications and data files puts tremendous pressure on networking infrastructure. While this pressure can be relieved at moderate cost in the premise Local Area Network (LAN) by migration to Fast Ethernet, LAN Switching or even Gigabit Ethernet technology, the residential local access loop presents a bottleneck. Many technologies such as ISDN, xDSL, HFC, FTTC, and FTTH have been proposed and tested in field trials. Unfortunately, most of these high-speed access technologies are too expensive for the typical residential consumer, and require expensive optical and electronic component technologies. Because of the telephone service providers' insistence on carrying voice and data over the same wiring infrastructure, priority-based network protocols such as ATM are typically utilized, further increasing the cost of the system.

Figure 1:
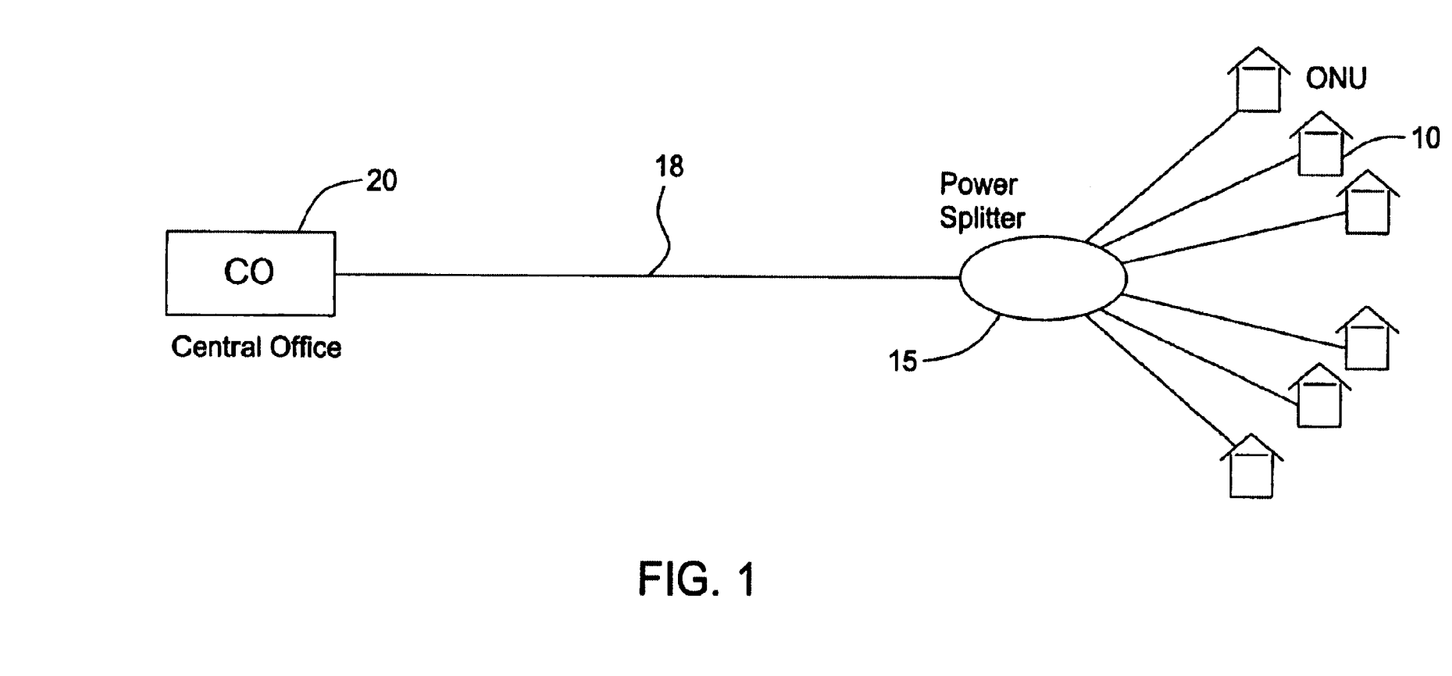
FIG. 1 shows a power-splitting fiber-to-the-home network.

A potential approach, as identified and addressed by the present invention, is to attempt using Ethernet over a power-splitting fiber-to-the-home (FTTH) network. A block diagram of a generic power-splitting FTTH network is shown in FIG. 1 in which multiple optical network units (ONUs) 10 are coupled to a power splitter 15 which is coupled via fiber 18 to a central office (CO) 20. Attempting to use Ethernet technology in such a configuration, however, is problematic.

In point-to-point links, Ethernet is typically limited to distances of less than 2–3 km due to either modal dispersion (over multi-mode fiber only) or power budget (over single-mode). The power budget limitation arises because no more than −4 to +2 dBm of optical power (depending on wavelength) may be emitted by an Ethernet LAN transceiver for eye safety reasons in an intra-building network. Such eye safety limitations, however, do not apply to access networks.

Although the constraints imposed by power budget and modal dispersion considerations can be overcome, the media access scheme of Ethernet imposes significant range limitations which impede scalability to access network applications. When sending data to the CO 20, the ONUs 10 negotiate for media access using the Ethernet carrier-sense-multiple-access/collision detection (CSMA/CD) media access control (MAC) layer protocol. In order for this protocol to operate properly, however, the round-trip delay of each packet may not exceed the duration of the shortest packet. For conventional 10 Mbps Ethernet, this constraint typically imposes a range limitation of a few kilometers. Such a range is inadequate for an access network. As such, the use of Ethernet technology in access networks is not practicable.

SUMMARY OF THE INVENTION

The present invention provides an optical data communications network in which the Ethernet media access control (MAC) layer protocol can be used over distances that are much larger than conventionally supported by the Ethernet MAC layer protocol. In accordance with the present invention, upstream and downstream traffic is logically or physically separated on a power-splitting FTTH network. Such an arrangement makes possible the use of ubiquitous and inexpensive Ethernet LAN technology in highly cost sensitive residential broadband access applications.

By logically and/or physically separating the upstream and downstream traffic in accordance with the present invention, the long fiber run 18 between the CO 20 and the power splitter 15 is removed from the CSMA/CD collision domain. The separation of traffic into upstream and downstream directions is consistent with the flow of traffic in access networks which is predominantly between a central office and multiple stations, rather than from station to station.

By removing the long fiber run 18 between the CO 20 and the power splitter 15 from the collision domain, the collision domain is thus made relatively small, thereby allowing greater upstream data rates than would otherwise be possible with conventional Ethernet. Upstream data rates can be increased even further by placing the splitter 15 even closer to the ONUs 10 thereby allowing an even smaller collision domain.

Furthermore, by separating the upstream and downstream traffic and thus removing the downstream traffic from the CSMA/CD collision domain, the downstream data rate is not limited by the size of the collision domain and can thus be substantially greater than the upstream rate. As such, whereas 10 Mbps rates can be provided in the upstream direction, 100 Mbps or greater rates can be provided in the downstream direction. This comports nicely with the typical requirements of access networks.

In an exemplary embodiment of the present invention, an overlay passive FTTH network for data communications to residential customers is provided which can be used, for example, for internet access, working-from-home, pay-per-view, Web-TV, etc. Voice encapsulated in Ethernet packets may also be carried over such a network. Other packet formats such as IP may also be used on the network layer.

While embodiments of the present invention described herein may be referred to as FTTH networks, naturally, the present invention is in no way limited to residential applications and can also be used, for example, in a wide variety of commercial, industrial and institutional applications, among others.

DETAILED DESCRIPTION

The present invention provides a power-splitting FTTH optical data communications network, such as the network of FIG. 1, which uses the Ethernet MAC layer protocol. In accordance with the present invention, the network is logically and/or physically divided into upstream and downstream portions. As a result, the fiber run 18 from the CO 20 to the power splitter 15 is not part of the CSMA/CD collision domain and can thus be much longer than is possible with conventional Ethernet applications.

As such, by separating the upstream and downstream traffic, the long fiber run from the CO 20 to the splitter 15 can be made almost arbitrarily long, limited only by the power budget. The power splitter 15 can be located close enough to the customer premises so that the distance between the ONUs 10 and the power splitter 15 does not exceed the upstream collision domain. Since upstream traffic is relatively modest in a typical access network, conventional Ethernet data rates are sufficient in the upstream direction. For a data rate of 10 Mbps, the shortest packet is 512 bits or 5.12 $\mu$sec long, resulting in a collision diameter of roughly 4 km, which is long enough for most installations.

Several embodiments of networks, in accordance with the present invention, will now be described in which the upstream and downstream data traffic are logically and/or physically separated.

The logical separation of the upstream and downstream networks can be implemented by providing separate upstream and downstream fibers and power splitters. In other words, the logical separation of the upstream and downstream networks can be achieved by physically separating the networks.

Figure 2A:
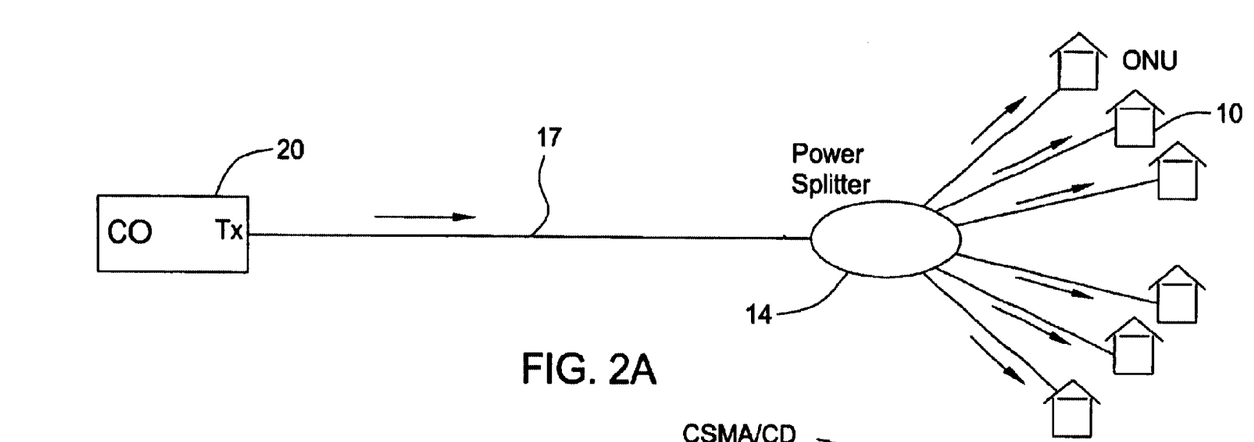
FIGS. 2A and 2B, 2C illustrate the logical and/or physical separation of downstream and upstream networks in a data network in accordance with the present invention.
Figure 2B:
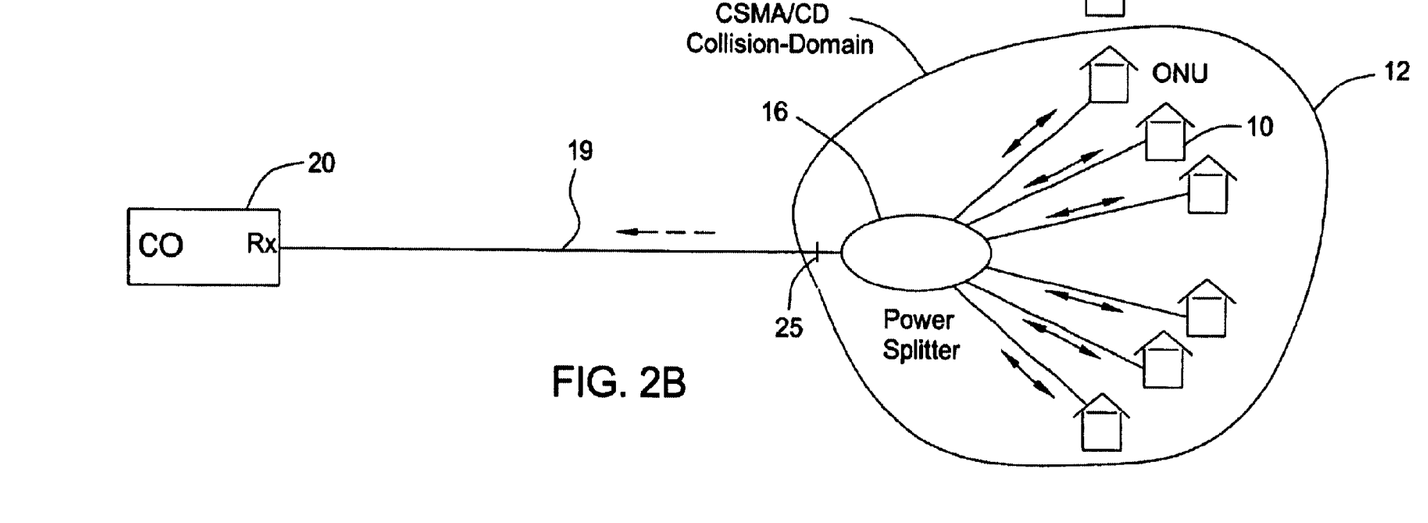
Figure 2C:
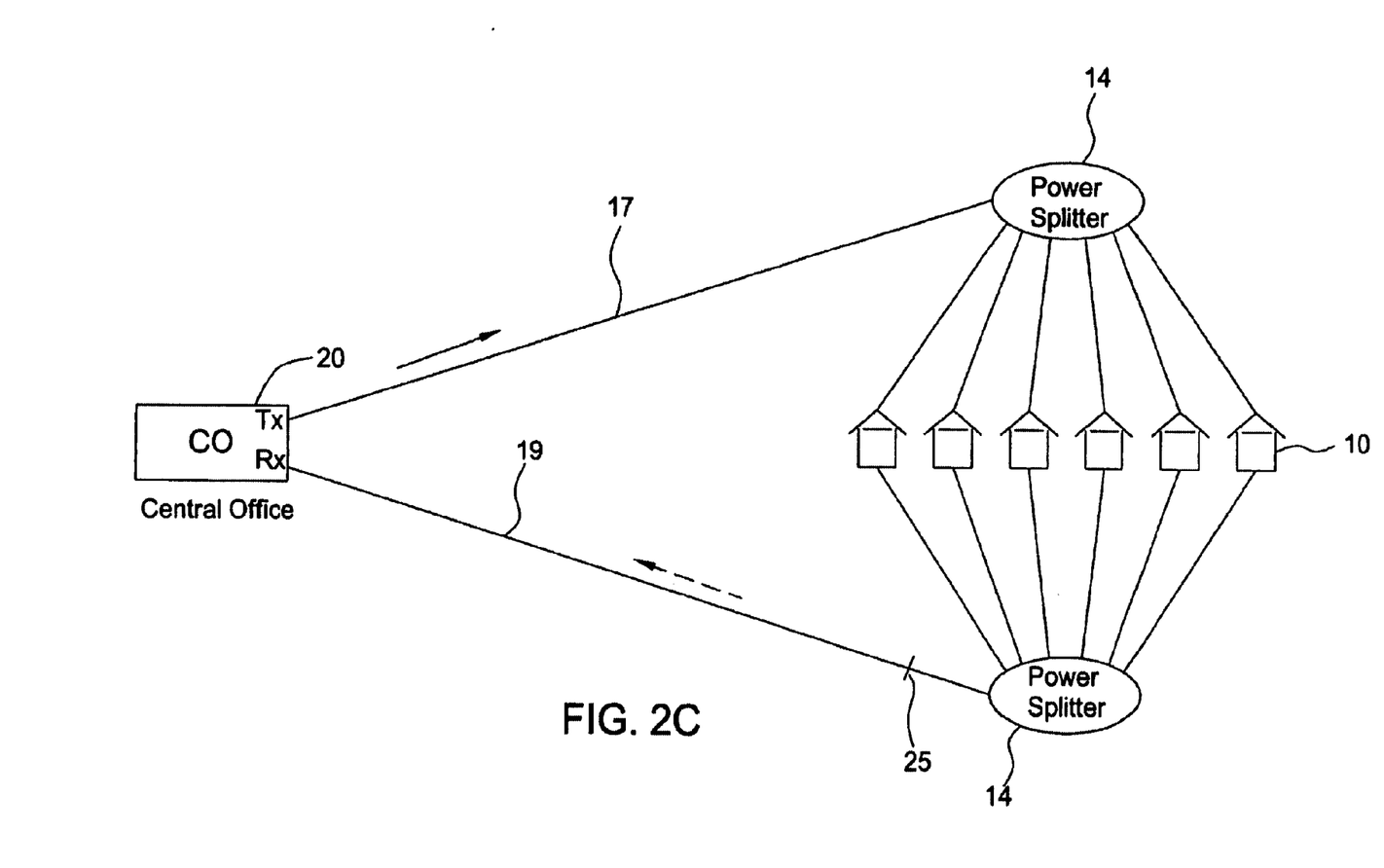

FIGS. 2A and 2B illustrate an exemplary embodiment of an FTTH network in which the downstream and upstream data traffic is physically separated. In this embodiment, in the downstream direction (FIG. 2A), the CO 20 is coupled via a downstream fiber 17 to a downstream power splitter 14 which is in turn coupled to a plurality of ONUs 10. In the upstream direction (FIG. 2B), the ONUs 10 are coupled to an upstream power splitter 16 which is coupled via an upstream fiber 19 to the CO 20.

In the downstream direction (FIG. 2A), the CO 20 is the only station transmitting, and no contention for media access occurs. As such, the downstream data rate can be substantially greater than the upstream data rate. Data for the different ONUs 10 is statistically multiplexed onto the fiber and is characterized by a different address (e.g., MAC address) for each ONU. In accordance with the MAC layer protocol, the ONU receivers filter out the appropriate packets.

In the upstream direction (FIG. 2B), the ONUs 10 negotiate for access to the shared upstream fiber 19 between the splitter 16 and the CO 20. A portion of the light transmitted to the power splitter 15 is reflected back to all ONUs 10 for carrier sensing and collision detection by using, for example, a partial reflector 25 in the fiber run 19 to the CO 20. However, the fiber run 19 to the CO 20 is not part of this collision domain, because it does not need to obtain media access. The upstream fiber 19 thus "listens" to the traffic between the ONUs 10, without actively participating. Therefore, the relevant collision domain 12 contains the ONUs 10 and the power splitter 16, but not the CO 20.

In the embodiment of FIG. 2B, a 3 dB splitter (not shown) at each ONU 10 can be used to separate the transmitted and received power on the upstream portion of the network.

In the embodiment of FIGS. 2A and 2B, each ONU 10 includes one transmitter (upstream) and two receivers. A first receiver of each ONU is used for carrier sensing and collision detection on the upstream traffic, and a second receiver is used to detect the downstream traffic from the CO 20.

Figure 3A:
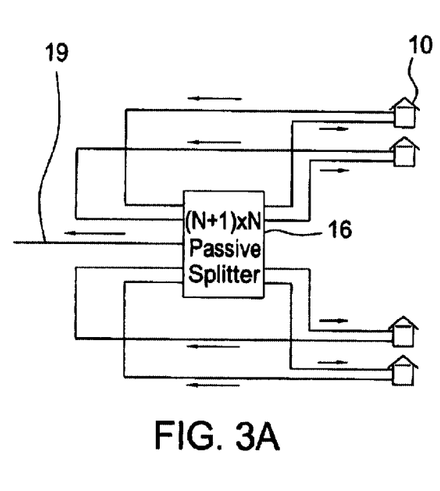
FIGS. 3A, 3B and 3C show three embodiments of an upstream portion of a network in accordance with the present invention.
Figure 3B:
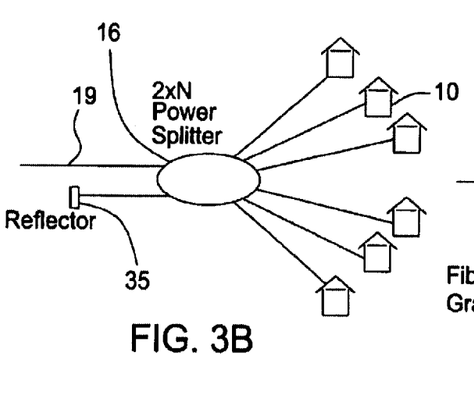
Figure 3C:
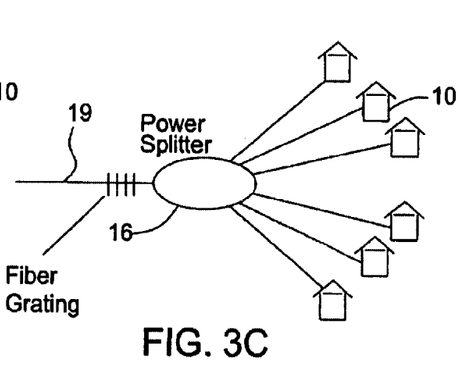

FIGS. 3A, 3B and 3C show three embodiments, in accordance with the present invention, of an upstream portion of a network using Ethernet CSMA/CD to negotiate access to the common fiber 19 to the CO 20 via the power splitter 16.

In the embodiment of FIG. 3A, the splitter 16 comprises a (N+1)×N power splitter, so that each ONU 10 has an input as well as an output fiber to the power splitter 16, resulting in two fiber runs between the splitter and each ONU 10.

The embodiment of FIG. 3B uses a 2×N power splitter 15, with a high reflector 35 attached to the second port of the splitter to reflect power to all of the ONUs 10.

In the embodiment of FIG. 3C, a partially reflecting fiber grating 45 is inserted in the fiber run to the CO 20 to reflect some portion of the upstream power back to the ONUs 10 for carrier sensing and collision detection.

In the embodiments of FIGS. 3B and 3C, a 3 dB splitter (not shown) at each ONU 10 can be used to separate the transmitted and received power on the upstream portion of the network.

Figure 4:
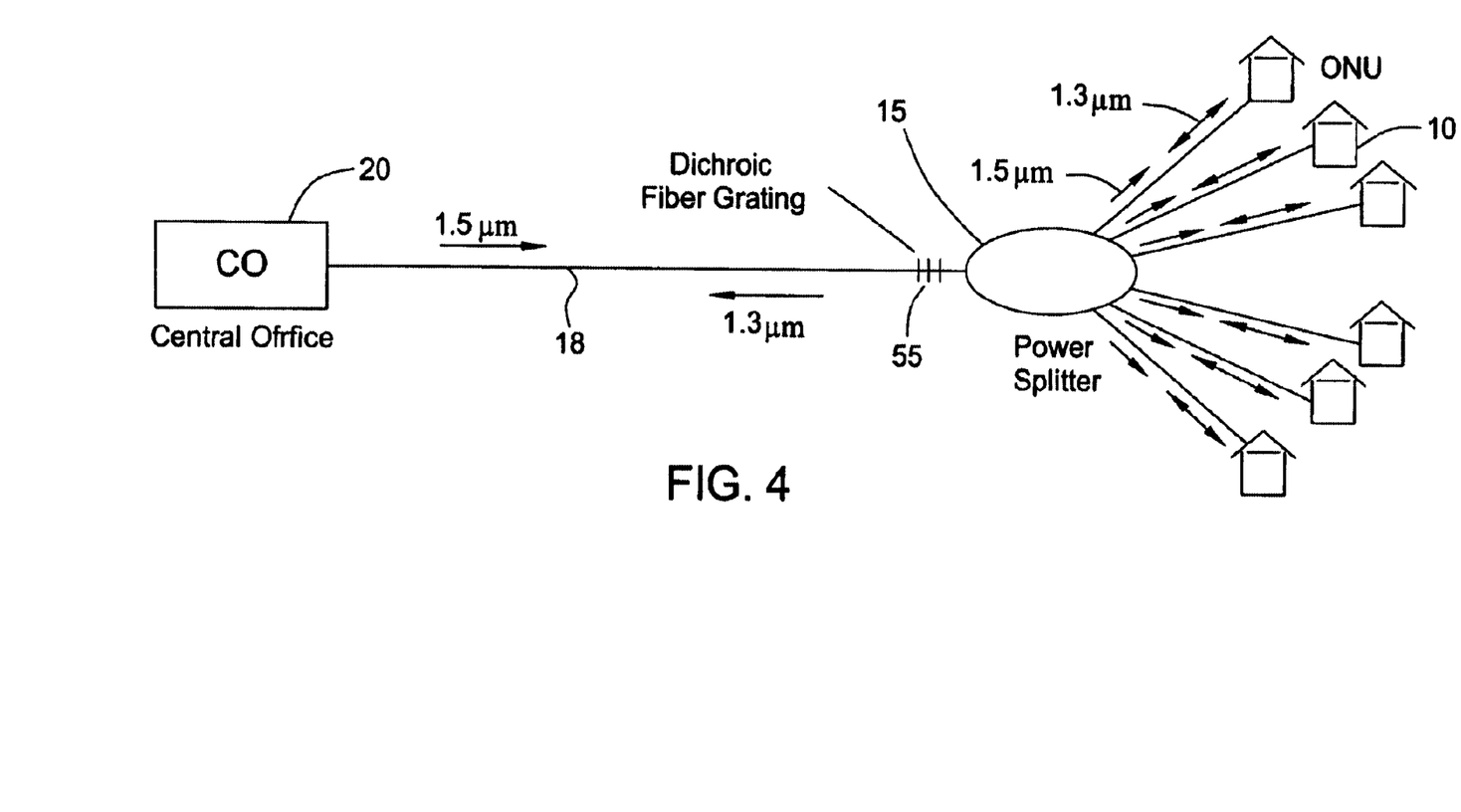
FIG. 4 shows a data network in accordance with the present invention in which upstream and downstream data traffic is separated using coarse wavelength division multiplexing (WDM).

In a further embodiment of a network in accordance with the present invention, the upstream and downstream paths share the same physical fiber plant 18 but are logically separated using coarse wavelength division multiplexing (CWDM). FIG. 4 illustrates such an embodiment. This embodiment has the advantage of avoiding the cost of the extra fiber and power splitter of the two-fiber embodiment, described above.

In the embodiment of FIG. 4, wavelengths of substantially 1.5 $\mu$m can be used for downstream traffic, while wavelengths of substantially 1.5 $\mu$m can be used for upstream traffic. In an alternative embodiment, 1.5 $\mu$m can be used for upstream traffic, and 1.3 $\mu$m can be used for downstream traffic. In the embodiment of FIG. 4, a dichroic fiber grating 55 which is partially reflecting at 1.3 $\mu$m and transparent at 1.5 $\mu$m is located on the fiber 18 between the splitter 15 and the CO 20, proximate to the power splitter 15. The grating 55 serves to reflect a portion of the upstream light back to the ONUs 10 for CSMA/CD purposes.

In the CWDM embodiment of FIG. 4, a CWDM splitter (not shown) at each ONU 10 can be used to separate the upstream and downstream data, whereas a 3 dB splitter (not shown) can be used to separate the transmitted and received upstream data.

The power-splitting network architecture of the present invention can be implemented using commercially available Ethernet components. A function performed by each ONU 10 is packet filtering, so that only those downstream packets corresponding to the ONU's address (e.g., MAC address) are available at the subscriber interface of the ONU. In the upstream direction, only packets destined for the CO 20 should leave the ONU 10 to travel onto the network.

Most likely, the subscriber would like to have a standard (e.g., 10 Base-T) interface to connect PC's or other data networking equipment to the network. To perform the appropriate packet filtering in both directions, the functionality of a (OSI Layer 2) bridge is provided at the ONU 10.

Because the downstream traffic is independent from the upstream traffic in the system of the present invention, it is possible to freely choose the downstream data rate. For example, the downstream traffic could be 100 Mbps Fast Ethernet, or even Gigabit Ethernet. In this case, different services such as internet access, pay-per-view video, and even voice telephony can be statistically multiplexed onto the large available downstream bandwidth. Each of these services would have a separate MAC address for each ONU 10, and a multiport bridge can separate the services at the ONU.

Figure 5:
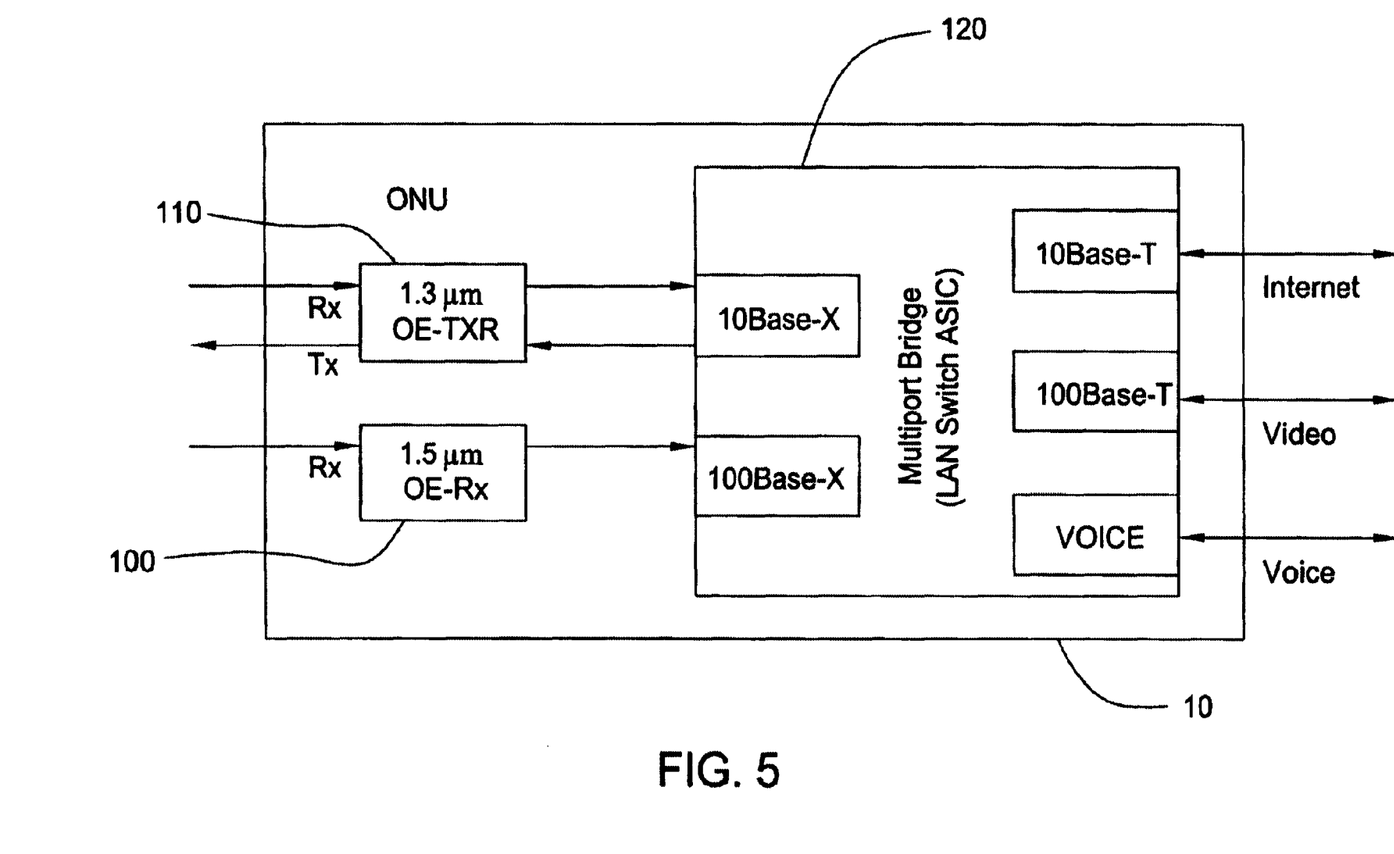
FIG. 5 is a block diagram of an exemplary embodiment of an optical network unit which uses coarse WDM, in accordance with the present invention.

FIG. 5 is a block diagram of an exemplary embodiment of an ONU 10 for multiple services. The ONU 10 of FIG. 5 includes a 1.5 μm receiver 100, a 1.3 μm transceiver 110 and a multiport bridge 120. The receiver 100 can be used to receive downstream 100 Mbps fast Ethernet traffic whereas the transceiver 110 handles two-way, 10 Mbps Ethernet traffic. The two streams are separated using CWDM or by physical separation, as described above in connection with FIGS. 2 and 3A–3C. The multiport bridge 120 filters packets with different Ethernet MAC addresses corresponding to different service and directs them to corresponding ports. In the exemplary embodiment of FIG. 5, the multiport bridge 120 provides a bidirectional 10 Base-T subscriber interface, such as for internet access, a one-way 100 Base-T subscriber interface, such as for downstream video, and a third interface, such as for voice. The multiport bridge 120 is preferably implemented as an ASIC which can be incorporated into the ONU 10 at low cost.

It should be noted that in accordance with the present invention, the routing of downstream traffic need not be limited to using MAC addresses. For example, traffic may be routed in accordance with IP addresses instead. In this case, an IP router can be used instead of a multiport bridge.

As discussed above, the downstream and upstream traffic are logically separated, in accordance with the present invention, thereby allowing the downstream traffic to have a substantially higher bit-rate than the upstream traffic. As described above, the upstream and downstream traffic can be separated by providing separate fiber and power splitters for each direction or by CWDM. Two additional arrangements for logically separating the upstream and downstream traffic will now be described, in accordance with the present invention.

Figure 6:
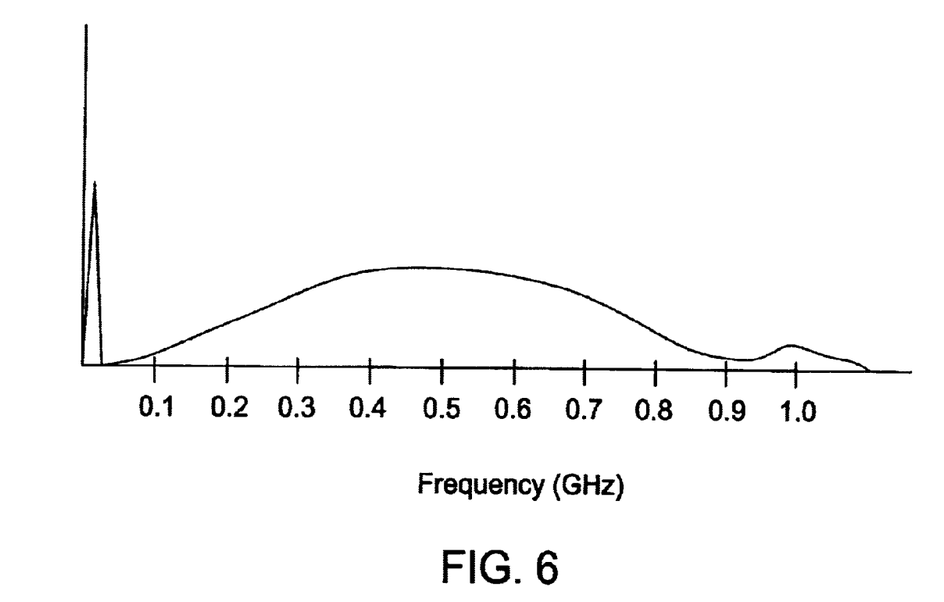
FIG. 6 shows the RF spectral densities of Ethernet and Gigabit Ethernet signals.

In one such embodiment, the upstream and downstream traffic are separated spectrally. For instance, the upstream data bit-rate can be at the conventional Ethernet rate (i.e., 10 Mbps), whereas the downstream bit-rate can be at the Gigabit Ethernet rate (i.e., 1.25 Gbps). FIG. 6 illustrates the RF spectral densities of Ethernet and Gigabit Ethernet, as used in the upstream and downstream directions, respectively, of the present embodiment. As shown in FIG. 6, 10 Mbps Manchester-encoded Ethernet has a power spectrum that has a first zero at approximately 15 Mhz. The power spectrum of 8B/10B-encoded 1.25 Gbps Ethernet has a first zero at approximately 940 Mhz and a peak at 470 Mhz, with no appreciable spectral content below 50 Mhz.

Figure 7:
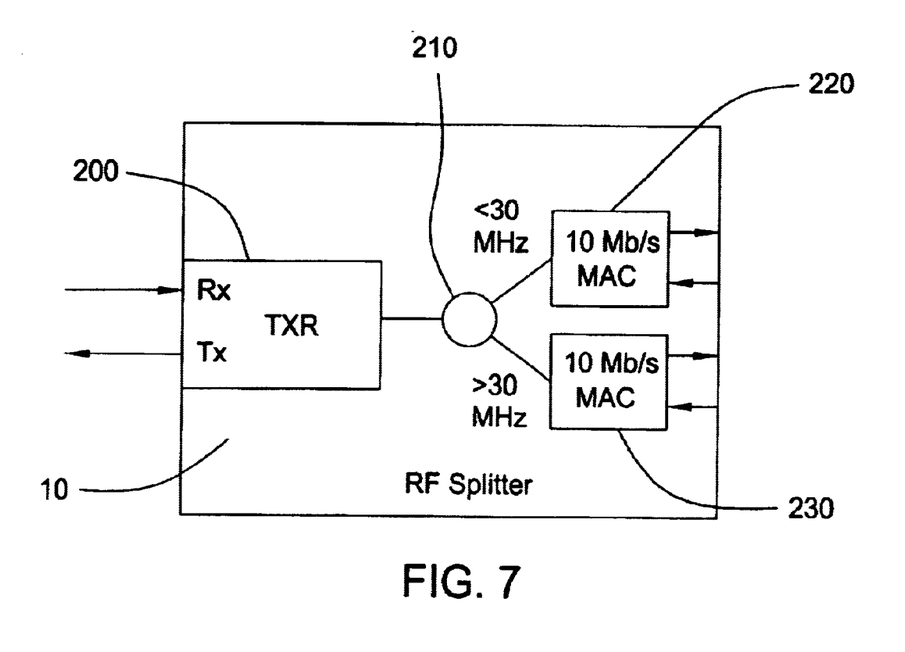
FIG. 7 is a block diagram of an exemplary embodiment of an optical network unit which uses subcarrier multiplexing, in accordance with the present invention.

A block diagram of an embodiment of an ONU 10 for use in a network in accordance with the present invention which uses spectral separation is shown in FIG. 7. The configuration of such a network is similar to that of FIG. 1, with a common distribution fiber 18 and a common power splitter 15. In this embodiment, each ONU 10 includes one opto-electronic transceiver 200, an RF splitter 210 and MAC and physical layer circuitry 220 and 230 for 10 Mbs Ethernet and Gigabit Ethernet, respectively. The splitter 210 routes signals below a threshold frequency to the 10 Mbs circuitry 220 and signals above the threshold frequency to the Gigabit circuitry 230. For the present embodiment which uses 10 Mbs Ethernet and Gigabit Ethernet, an appropriate threshold frequency for the splitter is in the range of 15–50 Mhz (e.g., 30 Mhz).

Unlike the ONU 10 of FIG. 5, which includes two receivers, one for carrier sensing and collision detection in the upstream direction and a second for receiving the downstream traffic, the ONU of FIG. 7 includes one receiver which is used for carrier sensing and collision detection as well as for detecting downstream traffic.

As a variant of the spectral separation embodiment described, true subcarrier multiplexing (SCM) can also be used. In such an embodiment, each of a plurality of baseband data streams is modulated with a different carrier signal.

In a further embodiment of a network in accordance with the present invention, the upstream and downstream traffic is logically separated using a ping-pong scheme. A block diagram of such an embodiment is shown in FIG. 8.

In the ping-pong scheme of the present invention, the CO 20 acts as a network master. Unlike conventional Ethernet operation in which the CO 20 transmits only when it detects that the shared fiber 18 is free of any other carrier, the CO 20 transmits an Ethernet jamming signal, such as would be used when a collision is detected, immediately before the CO transmits a data packet. The duration of the jamming signal is selected to correspond to the length of the longest possible packets (as specified by the Ethernet standard) transmitted by each of the ONUs 10. Transmitting the jamming signal ensures that the ONUs 10 have stopped transmitting and that all ONU packets have left the network before the CO packet arrives at any of the ONUs 10. In the ping-pong scheme of FIG. 8, in which the CO 20 transmits a jamming signal, no separation (such as by CWDM, separate fiber or spectral separation) is required as the CO 20 acts as the master controller. The CO 20 uses moderation in accessing the shared fiber 18, i.e., it leaves enough time between transmissions so that the ONUs 10 have a chance to transmit their own packets back to the CO 20.

Figure 8:
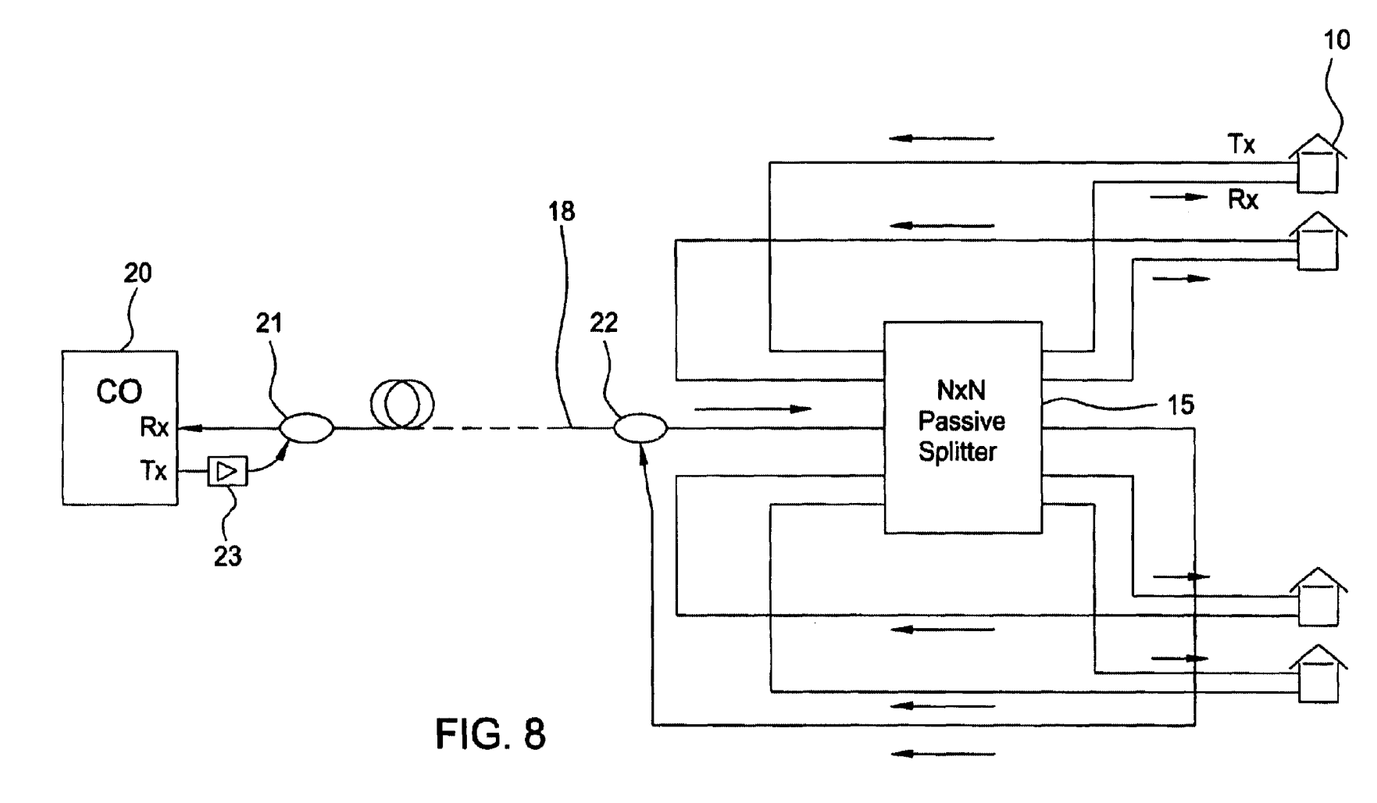
FIG. 8 shows a data network in accordance with the present invention in which upstream and downstream data traffic is separated using a ping-pong scheme.

In the embodiment of FIG. 8, the CO 20 is coupled to the fiber 18 via a coupler 21, preferably a 3 dB coupler. An isolator 23 can be inserted between the transmit output of the CO 20 and the coupler 22. The isolator 23 prevents feedback of the upstream light into the downstream transmitter. The ONUs 10 are coupled to an N×N passive splitter 15. The splitter 15 includes an input for downstream data and an output for upstream data which are coupled to a second 3 dB coupler 22. The couplers 21 and 22 are coupled via the common fiber 18 which carries both upstream and downstream traffic.

The couplers 21 and 22 and the isolator 23 can be eliminated if the feeder fiber 18 is replaced with separate upstream and downstream fibers.

It should be noted that all of the embodiments of FIGS. 3A–3C can be adapted for use in a pong-pong scheme similar to that of FIG. 7, in accordance with the present invention.

What is claimed is:

1. An optical communications system comprising:
   a central unit;
   a power splitter, the power splitter being coupled to the central unit via optical fiber; and
   a plurality of subscriber unit, each of the plurality of subscriber units being coupled to the power splitter via optical fiber, wherein:
the central unit transmits downstream data to the subscriber unit without media contention and the subscriber units transmit upstream data to the central unit with media contention, and
wherein:
a portion of an upstream data signal transmitted by any one of the plurality of subscriber units is reflected back to each of the subscriber units for detecting the transmission of upstream data by another subscriber unit.

2. The system of claim 1, wherein the upstream and downstream data are transmitted over physically separate paths.

3. The system of claim 2, comprising an additional power splitter, wherein:
the power splitter and the additional power splitter are coupled to the central unit via separate optical fibers, and
the power splitter and the additional power splitter are coupled to the subscriber units via separate optical fibers.

4. The system of claim 1, wherein the upstream and downstream data are transmitted over logically separate paths.

5. The system of claim 4, wherein the upstream and downstream data are separated by wavelength division multiplexing.

6. The system of claim 4, wherein the upstream and downstream data are spectrally separated.

7. The system of claim 6, wherein the upstream and downstream data have different data rates.

8. The system of claim 4, wherein the downstream data is transmitted during a first time period and the upstream data is transmitted during a second time period.

9. The system of claim 8, wherein the central unit transmits a jamming signal to clear the optical fiber of upstream data.

10. The system of claim 1, wherein the downstream data is transmitted at a higher rate than the upstream data.

11. The system of claim 10, wherein the downstream data has a rate at least ten times greater than the upstream data.

12. The system of claim 1, wherein a portion of an upstream data signal transmitted by any one of the subscriber units is provided by the power splitter to the subscriber units.

13. The system of claim 1, wherein the media contention is characterized by a collision domain which does not include the central unit.

14. An optical communications system comprising:
a central unit;
a power splitter, the power splitter being coupled to the central unit via optical fiber; and
a plurality of subscriber unit, each of the plurality of subscriber units being coupled to the power splitter via optical fiber,
wherein:
the central unit transmits downstream data to the subscriber unit without using a carrier sense multiple access with collision detection (CSMA/CD) protocol, and the subscriber units transmit upstream data to the central unit with CSMA/CD protocol, and
wherein:
a portion of an upstream data signal transmitted by any one of the plurality of subscriber units is reflected back to each of the subscriber units for detecting the transmission of upstream data by another subscriber unit.

* * * * *